March 29, 1932.   E. G. DURANDO   1,851,422
LIQUID LEVEL CONTROL
Filed Oct. 12, 1929
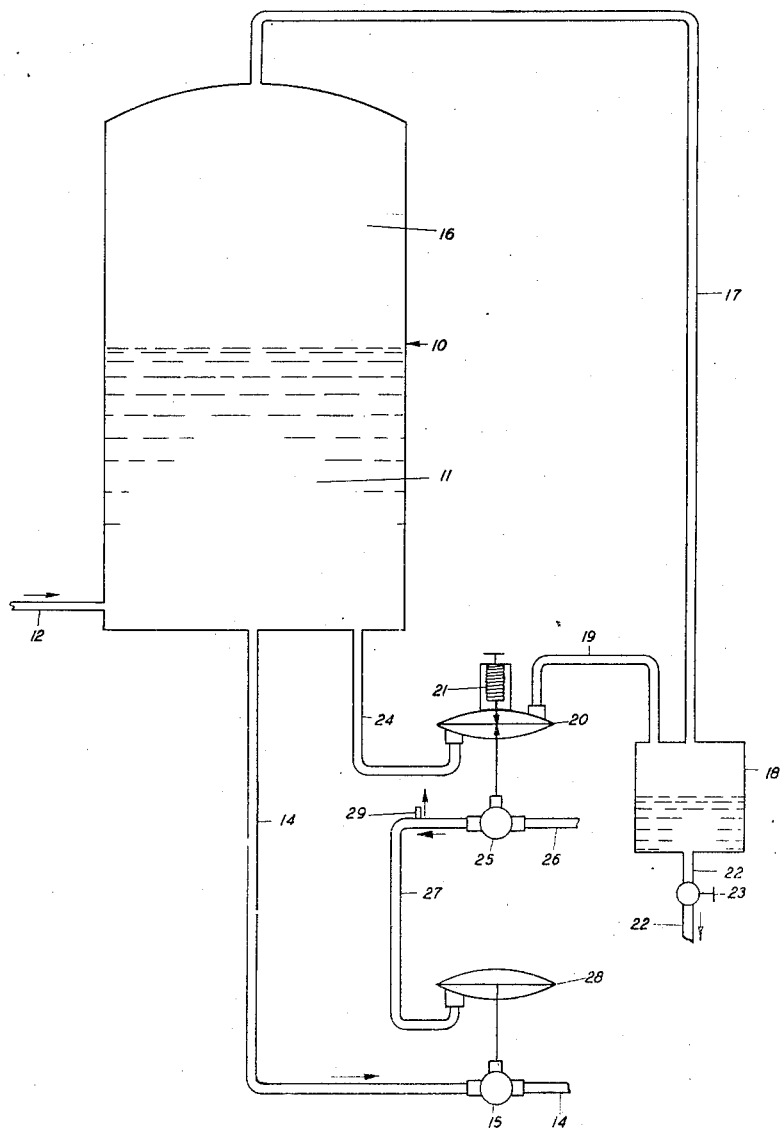
EUGENE G. DURANDO
INVENTOR
ATTORNEY Patented Mar. 29, 1932

1,851,422

UNITED STATES PATENT OFFICE

EUGENE G. DURANDO, OF LOS ANGELES, CALIFORNIA

LIQUID LEVEL CONTROL

Application filed October 12, 1929. Serial No. 399,249.

My invention pertains to the art of maintaining a constant level or depth of liquid in a tank which is under pressure.

The object of my invention is to provide a liquid level control suitable for application to tanks on which a pressure other than that of atmosphere is maintained and which will function regardless of variations in pressure, and which has all its moving parts situated outside the tank and at any convenient distance therefrom, and which may readily be adjusted to maintain a new level as desired.

Referring to the attached drawing, the figure represents diagrammatically an embodiment of my invention applied to a tank containing liquid.

10 is a tank, 11 is liquid therein, 12 is an inlet pipe through which further quantities of liquid are flowing into the tank, 14 is a pipe through which liquid is being continuously withdrawn from the tank and 15 is a valve controlling the rate of flow and which is preferably a balanced valve.

The space 16 above the liquid (which is assumed to be under a pressure different from atmospheric) communicates through a pipe 17 with a drain pot 18 and through a pipe 19 with the upper side of a diaphragm pressure regulator 20 provided with an adjustable compression spring 21. The drain pot is provided with a drain pipe 22 controlled by a valve 23.

A pipe 24 leads from the bottom of the tank to the lower side of the pressure regulator 20, and this regulator is so coupled that the deflection of the diaphragm under varying pressure differences actuates a control valve 25, which should also be a balanced valve. To the inlet end of this valve is connected a pipe 26 communicating with a supply fluid (as of air or gas) under pressure; to the outlet end a pipe 27 communicating with the lower side of a second diaphragm regulator 28, the diaphragm of which actuates the liquid control valve 15. Somewhere along the course of the pipe 27 is placed a small leakage orifice indicated at 29, through which air or gas may escape.

This apparatus functions in the following manner. The tank 10 containing any depth of liquid in free communication with the lower side of the regulator 20, the diaphragm is urged upwardly by hydraulic head plus the pressure existing above the liquid column and downwardly by the latter pressure only, therefore the net upward pressure is the hydraulic head, irrespective of any added or reduced pressure above the liquid.

If the hydraulic head be increased the diaphragm rises against the pressure of the spring 21, opening valve 25 and admitting air or gas under pressure to the lower side of diaphragm 28, thus lifting this diaphragm and opening valve 15. The opening of this valve permits liquid to flow from tank 10 through pipe 14, thus reducing the hydraulic head, diaphragm 20 returns to its lower position, valve 25 closes, shutting off the supply of air, the air under pressure escapes through orifice 29, diaphragm 28 returns to its original position and flow through pipe 14 ceases.

Orifice 29 should be minute, to prevent undue wastage of air or gas. The desired hydraulic head may be obtained by adjusting the compression on spring 21, an increased compression increasing the head required to actuate air valve 25 and through it liquid valve 15. The drainage pot 18 is used to separate any liquid which may condense in pipes 17 and 19 and which might otherwise flood diaphragm 20.

While the above movements are so described as to indicate that they are intermittent they are actually continuous, provided a stream of liquid is flowing through the tank. The desired liquid level being established by regulation of the spring both valves will remain open to such distance as to maintain an outflow equal to the inflow, responding to changes in inflow rate of slight variations in position which tend to correspondingly regulate the rate of outflow.

It is possible to eliminate air valve 25 and the diaphragm 28 from the combination and to connect diaphragm 20 direct to liquid valve 15. In such arrangement, however, the relatively slight changes in pressure due to changes in hydraulic head have to care for the operation of the relatively large and heavy liquid valves, so that this simplified combination will be rather irresponsive unless diaphragm 20 is of large diameter. In the combination shown valve 25 may be very small (as say ¼" pipe size) and may thus be freely moved by slight changes in hydraulic head to control an air supply which will in turn actuate the heaviest liquid valve.

I claim as my invention:

1. A device for controlling liquid level in a substantially closed tank, comprising: a valve; means of communication between said valve and the lower portion of said tank; a diaphragm regulator adapted to open and close said valve; means of communication between said regulator and means for supplying gas under pressure derived from a source other than the tank to be regulated, to diaphragm regulators; a valve in said means; a second diaphragm regulator adapted to open and close last said valve; means of communication between the valve side of last said regulator and the lower portion of said tank; means of communication between the opposite side of last said regulator and the upper portion of said tank, and means for the gradual dissipation of gaseous pressure from the interior of the gas supply means.

2. A device for controlling liquid level in a substantially closed tank, comprising: a valve; means of communication between said valve and the lower portion of said tank; a diaphragm regulator adapted to open and close said valve; means of communication between said regulator and a supply of fluid under pressure; a valve in said means; a second diaphragm regulator adapted to open and close last said valve; means of communication between the valve side of last said regulator and the lower portion of said tank, means of communication between the opposite side of last said regulator and the upper portion of said tank, and means for varying the resistance to deflection of last said diaphragm.

3. A liquid level regulating system comprising a tank, a drainage pipe therefor; a supply pipe for compressed gas, having valve means for opening and closing the gas supply by the sole action of the hydrostatic head within the tank; means for enabling the so-controlled gas supply to regulate the flow through the exit pipe, and means in the compressed gas supply pipe for the gradual relief of gaseous pressure accumulated therein.

In witness that I claim the foregoing I have hereunto subscribed my name this 2nd day of October, 1929.

EUGENE G. DURANDO.